United States Patent [19]

Arai et al.

[11] Patent Number: 5,193,172
[45] Date of Patent: Mar. 9, 1993

[54] MEMORY MANAGEMENT SYSTEM FOR DISPATCHING ONLY TO A SELECTED HIGH-USE-PRIORITY TASK A MAXIMUM ALLOCATED AND GIVEN HIGHEST-USE-PRIORITY REAL-PAGES WHEN REQUESTED

[75] Inventors: Toshiaki Arai, Sagamihara; Yoshitaka Ohfusa, Yokohama; Hirohumi Nagasuka, Kawasaki; Yasufumi Yoshizawa, Tachikawa, all of Japan

[73] Assignee: Hitachi, Ltd., Tokyo, Japan

[21] Appl. No.: 468,355

[22] Filed: Jan. 22, 1990

[30] Foreign Application Priority Data

Jan. 23, 1989 [JP] Japan ................................. 1-11932

[51] Int. Cl.⁵ ...................... G06F 12/06; G06F 12/08
[52] U.S. Cl. ............................... 395/425; 364/DIG. 1; 364/243.4; 364/246; 364/246.12; 364/246.3; 364/254.3; 364/281.3; 395/650
[58] Field of Search ............... 364/200 MS File; 395/650, 425

[56] References Cited

U.S. PATENT DOCUMENTS

| | | | |
|---|---|---|---|
| 4,403,286 | 9/1983 | Fry et al. | 364/200 |
| 4,481,583 | 11/1984 | Mueller | 395/725 |
| 4,669,043 | 5/1987 | Kaplinsky | 364/200 |
| 4,727,487 | 2/1988 | Masui | 364/200 |
| 4,747,130 | 5/1988 | Ho | 395/200 |
| 4,805,097 | 2/1989 | DeSanna | 364/200 |
| 4,809,157 | 2/1989 | Eilert et al. | 364/200 |
| 4,967,353 | 10/1990 | Brenner et al. | 364/200 |
| 5,109,512 | 4/1992 | Bahr et al. | 395/650 |

OTHER PUBLICATIONS

Wah et al.; "A Comparative Study of Distributed Resource Sharing on Multiprocessors"; AMC 1983; pp. 301-308.
A. V. Maksimenkov; "Distribution of Tasks Among the Units of a Computer Network"; Automatika; Vychistitel's Naya Tekmika vol. 21, No. 2, pp. 3-10, 1986.
Madnick et al.; "Operating System"; McGraw-Hill Book Company.

Primary Examiner—Thomas C. Lee
Assistant Examiner—Krisna Lim
Attorney, Agent, or Firm—Antonelli, Terry Stout & Kraus

[57] ABSTRACT

An information processing system managing a virtual memory by using a real memory system comprising a single or a plurality of processors which, when a real page allocation request occurs in a processor or task keeping the use priority that the real pages of a group among the divided groups of the real pages of said memory can be used in a priority basis, allocated the real pages belonging to said group for which said processor or task keeps the use priority to said processor or task in a priority basis so as to decrease the cache cancel rate and the mapping fault occurrence rate and to allow for smoothing and high speed access of the main memory.

12 Claims, 7 Drawing Sheets

MEMORY MANAGEMENT SYSTEM FOR DISPATCHING ONLY TO A SELECTED HIGH-USE-PRIORITY TASK A MAXIMUM ALLOCATED AND GIVEN HIGHEST-USE-PRIORITY REAL-PAGES WHEN REQUESTED

BACKGROUND OF THE INVENTION

1. Field of the Invention

This invention relates to a tightly coupled multiprocessor system which comprises main memory and a plurality of processors and to a real memory management method effectual for a large scale computer system which is connected to a large number of main memories and manages a virtual memory by paging or swapping.

2. Description of the Prior Art

The tightly coupled multiprocessor system which comprises a main memory and a plurality of processors is increasingly used for large scale general-purpose computer systems as a technique for promoting high performance and reliability in computer systems. An important problem for the tightly coupled multiprocessor system what type of algorithm is to use for allocating tasks or computer resources to a plurality of processors. The master/slave system is a system in which only a predetermined processor (master processor) performs system resource management and task scheduling. Although the above system has a comparatively simple structure, it has disadvantages in that the master processor is subjected to a substantial load and is affected by faults, and hence it is not a tightly coupled multiprocessor system in the true sense. The system having, individual operating systems (OS) is a system in which an operating system is provided for each processor and each operating system performs resource management of the assigned processor and task scheduling. In such a system, it is hard to equalize the load balance and to improve the general performance. The system of 1-operating system is a system in which an operating system performs processing on one of the processors when necessary. This is a tightly coupled multiprocessor system in the true sense. For further details of the above multiprocessor systems, refer to, for example, "Operating System" by S. E. Madnick.

As mentioned above, descriptions of many multiprocessor systems have been published as examples techniques on task scheduling and resource management allocation.

Another system which is increasingly used as a mechanism for high performance computer systems is a system in which the apparent access speed of a main (real) memory is increased by using a high speed buffer memory. This buffer memory, called a cache or buffer, cannot be seen from the processor, but is located between the processor and the main memory and stores a region of the main memory which is frequently referred to. Such kind of buffer memory is disclosed e.g. in a book written by Ishida and Murata entitled Very Large Scale Computer System; Dec. 1970. When the processor presents an access request to the main memory and the requested region is retained in the cache, the processor can fetch the region from the cache at a high speed instead of the main memory. Since the access time of the main memory is long compared with the processing time of the processor, this cache system whose access speed is higher than the access speed of the main memory (for example, the cache access time is about 1/10 of the main memory access time) is effectual for improving the performance of computer systems.

This cache system can be effectively applied to computer systems using the above tightly coupled multiprocessor mechanism. However, there are some problems on application of the cache system. The first problem is a phenomenon which is called cache cancel. The cache is required to be installed close to the processor to allow for quick access by the processor. Therefore, a cache memory exists for each processor. This configuration may cause a region (assumed as region A) in a main memory to exist in two or more caches (assumed as caches X and Y). In this case, when the processor corresponding to the cache X presents a write request to the region A, the data a in the region A of the cache X is rewritten, for example, to a'. As a result, the data a' contradicts the data a in the region A of the cache Y, and the region A of the cache Y is ignored (for example, erased). By doing this, the effectiveness of the cache Y is decreased. This is referred to as a cache cancel phenomenon. Such a phenomenon may occur when the data of the cache Y is rewritten. As the size of the region in a cache increases to increase the effect of the cache, the region of the cache of the other processors is ignored, resulting in a reduction in the performance of the entire system.

Another problem with memory control is caused by differences in access speed between main memories. In recent large scale computer systems, the number of tightly coupled processors increases year by year, and the main memory capacity increases in proportion to the number. As a result, a situation in which the connection locations of the processors and various regions in the main memory are not uniform often occurs. For example, a processor can access region of the main memory at one high speed, while the processor accesses another region at a low speed. For another processor, the access speed to each of such regions is in reverse relation.

As mentioned above, the memory management mechanism which obtains good results in the conventional single processor system is often a bottleneck of performance of the multiprocessor system.

SUMMARY OF THE INVENTION

The objects of the present invention are to solve the above problems and to provide a real memory management system which can fulfill the functions indicated below.

(1) A function to allocate a main memory and to dispatch tasks with few cache cancels.

(2) A function to allow a processor or task to use the accompanied main memory region having a high access speed on a priority basis.

(3) A function to always keep a real memory which can be allocated when a processor or task causes a mapping fault in the virtual memory (a status that the page to be used by the virtual memory system does not exist in the main memory; the same as a page fault).

(4) A function to provide a uniform occurrence of mapping faults among the processors or tasks.

(5) A function to suppress an issue of a low-speed exclusive control instruction by distributing the management of the free region of the main memory among the processors or tasks. To accomplish the above objects, the real memory management system of the present invention is configured as follows:

(1) In an information processing system which manages a virtual memory by a multiprocessor system comprising a plurality of processors sharing a real memory, when each of a plurality of groups to which the real pages of said real memory are distributed as is designated a processor for keeping the use priority which is a right for using the real pages in the group in a priority basis and a real page allocation request occurs in a processor, said processor allocates the real pages belonging to said group keeping the use priority in a priority basis, or in an information processing system which manages a virtual memory by processors and a real memory, when each of a plurality of groups to which the real pages of said real memory are distributed is designated as one of a plurality of tasks dispatched in said virtual memory keeping the use priority which is a right for using the real pages in the group in a priority basis and a real page allocation request occurs in a task, said task allocates the real pages belonging to said group keeping the use priority in a priority basis.

(2) A processor or task with a maximum access speed to a real memory is given the use priority of the real pages in said real memory.

(3) The number of real pages allocated to a task is measured for each of said groups, and for dispatch of said tasks, said group having said task with a maximum number of real pages allocated is dispatched with a processor or task keeping the use priority in a priority basis (refer to Step 802 of FIG. 8 shown later).

(4) Page fault occurrence information is obtained for each processor or task, and the processor with a high mapping fault rate periodically increases the number of real pages belonging to said group keeping the use priority (refer to FIG. 5, especially Step 503).

(5) If no available real pages exist in said group keeping the use priority when a page fault occurs, a processor or task obtains a plurality of available real pages from said group keeping a maximum number of available real pages, and said processor or task becomes a member of said group keeping the use priority (refer to Steps 306 and 307 of FIG. 3).

(6) The page steal processing in which the real pages allocated to a task are stolen is performed by applying a different algorithm to each of said groups keeping the real pages allocated to said task (refer to Steps 404 and 405 of FIG. 4).

(7) The page steal processing gives priority to stealing of said group allocated a minimum number of pages among said groups keeping the real pages allocated to said task.

Descriptions of the functions of the above configuration follow. By the above configuration, when a task is first dispatched by a processor, said processor allocates the main memory keeping the use priority to said task, and after control is stolen from said task, the possibility of redispatch of said task by said processor is increased (especially by the above configuration of (1) or (3)).

By the above functions:

(1) The possibility of access of only a specific processor or task to a main memory region is increased and the cache cancel rate is decreased (especially by the above configuration of (1) or (3)).

(2) Allocation of the use priority to a high-speed main memory as viewed from a processor or task allows for high-speed access to said main memory (especially by the above configuration of (1) or (2)).

(3) Making regions other than a main memory keeping the use priority usable avoids the available main memory lack status when a mapping fault occurs (especially by the above configuration of (1), (3), or (6)).

(4) Periodic adjustment of the capacity of a main memory keeping the use priority smoothes the mapping fault occurrence rates among the processors or tasks (especially by the above configuration of (1) or (4)).

(5) Since the main memory region keeping the use priority is controlled in a batch by the corresponding processor or task, an issue of an exclusive control instruction is suppressed. The foregoing and other objects, advantages, manner of operation and noval features of the present invention will be understood from the following detailed description when read in connection with the accompanying drawings.

DETAILED DESCRIPTION OF THE PREFERRED EMBODIMENTS

Descriptions of the embodiments of the present invention follow with reference to the accompanying drawings.

Figure 1:
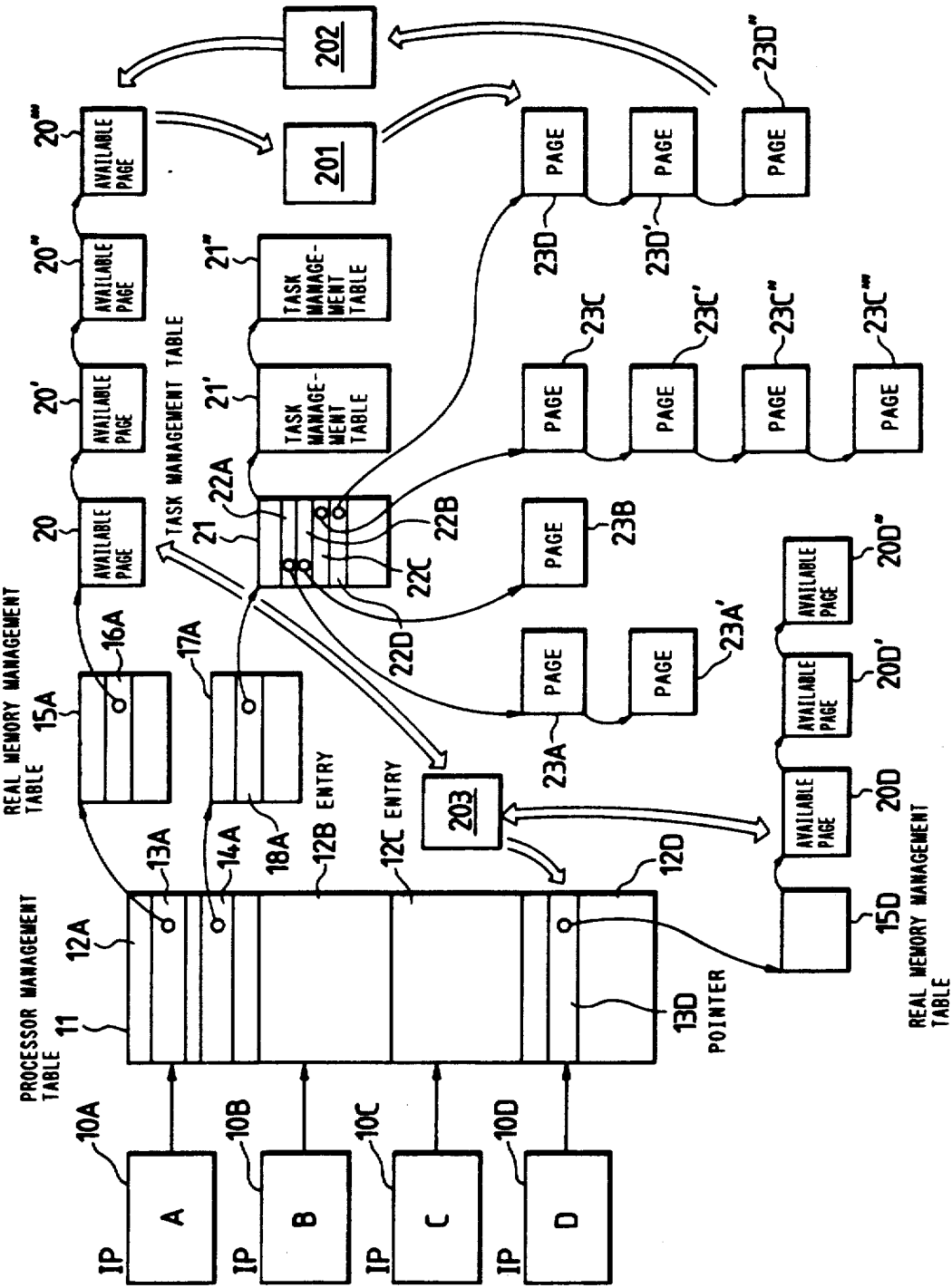
FIG. 1 is a schematic view of an embodiment on which a real memory management system of the present invention is realized by using a 4-multiple tightly coupled multiprocessor.

FIG. 1 is a schematic view of an embodiment of the real memory management system of the present invention, which illustrates the table-related structure of a 4-multiple tightly coupled multiprocessor comprising four processors A, B, C, and D. In FIG. 1 and the following drawings, each numeral designates a unit commonly applied to the processors, and each numeral followed by an alphabetic character designates a dedicated unit of the processor indicated by the alphabetic character.

Instruction processors 10A, 10B, 10C, and 10D are controlled by entries 12A, 12B, 12C, and 12D of each processor management table 11. The processor management table entries 12A to 12D store pointers 13A to 13D for real memory management tables 15A to 15D of the corresponding processors and pointers 14A to 14D for dispatch management tables 17A to 17D. Since the tables of the processors 10B to 10D are the same as those of the processor 10A, only the tables of the processor 10A will be described hereunder.

An available priority use real page chain pointer 16A which is one of the entries of the real memory management tables 15A indicates the head of the available region chain of the real page for which the corresponding processor keeps the use priority. Numerals 20, 20', 20", and 20''' designate four pages comprising the available region chain. In this embodiment, therefore, there are four available pages for which the processor 10A keeps the use priority. Available pages for which the processor 10D keeps the use priority are three pages 20D, 20D', and 20D" which are directed by the pointer 13D. A priority dispatch task chain pointer 18A which is an entry of the dispatch management table 17A indicates the head of the task chain which can be dispatched by the corresponding processor no priority basis. Numerals 21, 21', and 21" designate the management (control) tables for the chained tasks. The chained task management table 21 stores pointers 22A, 22B, 22C, and 22D to the real page chain kept by the corresponding task for each processor keeping the use priority. Each pointer indicates the head of each of real pages 23A to 23D for which the corresponding processor keeps the use priority. In this embodiment, numerals 23A and 23A' designate pages (a page per each) for which the processor 10A keeps the use priority, numeral 23B a page corresponding to the processor 10B, numerals 23C to 23C'''pages corresponding to the processor 10C, and numerals 23D to 23D" pages corresponding to the processor 10D. Therefore, the task 21 has a real memory region of 10 pages in total, and 23A and 23A' are two priority pages of the processor A, 23B one priority page of the processor B, 23C to 23C''' four priority pages of the processor C, and 23D to 23D" three priority pages of the processor D. It is desirable that almost all the pages of the task 21 managed by the management table A are used by the processor A on in a priority basis. As described later, therefore, the real memory management system is gradually transferred to this desirable status.

When a page fault occurs in a task which is being processed by a processor (for example, the processor A), a real page allocation unit 201 fetches the real pages from the available real page region chain for which the processor A keeps the use priority and allocates them to the task in which the page fault occurs.

When stealing pages from a task for which a processor has the dispatch priority, a page steal unit 202 steals the real pages for which said processor does not keep the priority in a priority basis. The page allocation unit 201 and the page steal unit 202 increase the probability that for the real pages allocated to a task for which a processor keeps the dispatch priority, said processor keeps the use priority.

A memory management threshold control unit 203 is periodically activated and controls unbalanced numbers of available pages of the processors and updates the page steal and allocation thresholds. By doing this, the real memory management system performs memory management and dispatch according to a change in the system load.

Figure 2:
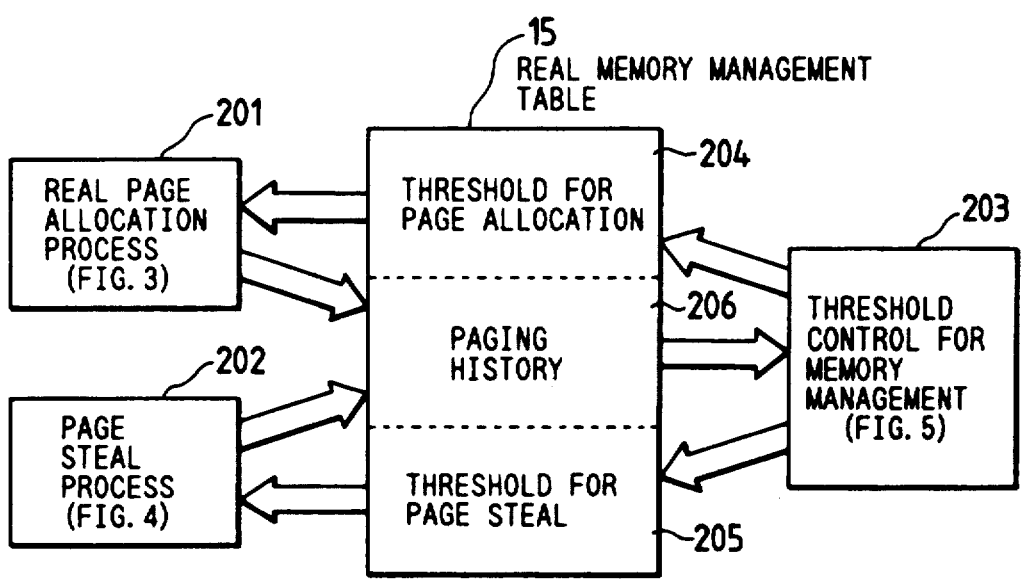
FIG. 2 illustrates the relation between the memory control unit and the management table.

FIG. 2 illustrates the relation between the control unit for memory management and the management table. The control unit for memory management comprises the real page allocation unit 201 and the page steal unit 202 (if all the real pages are allocated when a page fault occurs, no pages can be fetched from the auxiliary memory, and hence page data which is not used for a long time is transferred to the auxiliary memory, and the resultantly freed pages are registered in the upchain). Using a page allocation threshold 204 and a page steal threshold 205 in the real memory management table 15, the two processing units execute each function and store the history in the real memory management table 15 as a paging history 206.

The memory management threshold control unit 203 sets periodically a new threshold on the basis of the paging history 206 collected by the above processing, and stores it in the corresponding entry in the real memory management table 15.

Figure 3:
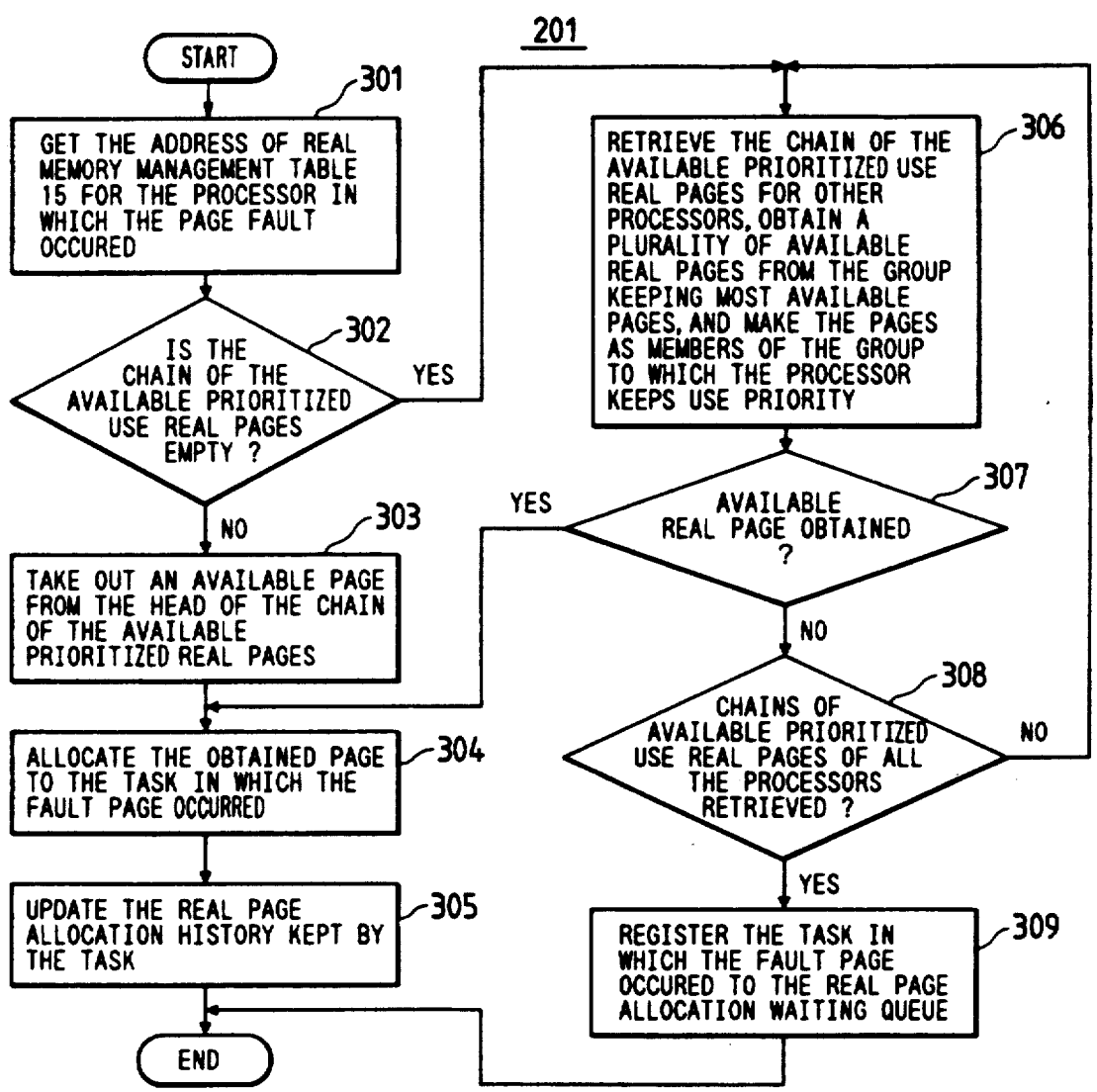
FIG. 3 is a flow chart for illustrating an embodiment of the real page allocation unit.

FIG. 3 is a flow chart for illustrating an embodiment of the real page allocation unit 201. The processing when a page fault occurs in a task dispatched by a processor will be described hereunder. First, the real memory management table 15 for said processor is obtained (Step 301). Next, the available priority use real page chain for said processor is retrieved (Step 302). When said chain is available, an available real page is fetched from said chain (Step 303), and the page is allocated to the task in which the page fault occurs (Step 304). When said chain is not available, the available priority use real page chain for another processor is retrieved (Step 306). When the available real page can be obtained by this retrieval (Step 307), said real page is allocated to said task (Step 304). If no available real pages can be obtained when all the available priority use real page chains for all the processors of the multiprocessor are retrieved (Step 308), the task in which the page fault occurs is registered in the general real page allocation queue and the processing ends (Step 309). When the allocation is completed, the group to which the allocated real pages belong and the allocated task are stored in the corresponding real memory management table 15 as a paging history (Step 305).

Figure 4:
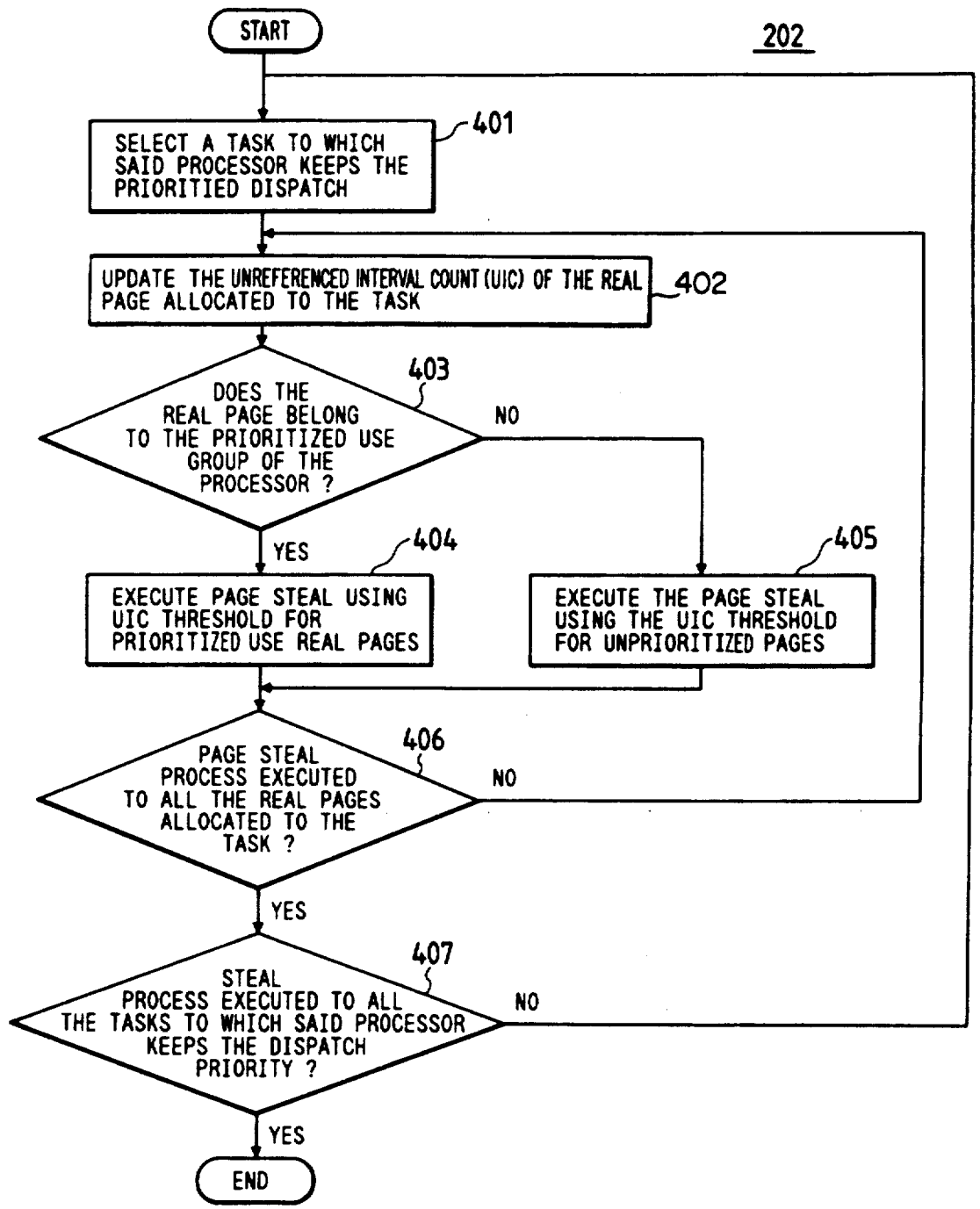
FIG. 4 is a flow chart for illustrating an embodiment of the page steal unit.

FIG. 4 is a flow chart for illustrating the page steal unit 202. The page steal processing is periodically activated, and the task which uses the CPU for a fixed time after the previous page steal processing is performed is an object for page steal. First, a task which meets the above condition is selected from the tasks for which said processor keeps the dispatch priority (Step 401). Next, the unreferenced interval count (UIC) for each real page allocated to said task is updated (Step 402). This processing is the same as the conventional one; that is, the reference bit of a real page is retrieved. When the bit is on, the corresponding UIC is set to 0 and the reference bit is reset. When the reference bit is off, the corresponding UIC is incremented by 1. If the UIC exceeds the threshold when said UIC is updated, said page is stolen (Steps 404 and 405). When said page, in this case, belongs to the priority use group of said processor, the UIC threshold for the priority use real page is used. When said page does not, the general page UIC threshold is used (a different algorithm is used) (Step 403). The above UIC updating is performed for all the real pages allocated to said task (Step 406). The UIC updating is also performed for all the tasks for which said processor keeps the dispatch priority (Step 407).

In this embodiment, the working set (WS) method is used as a replacement algorithm, and the steal priority for the priority use real pages and that for the other real pages are made different from each other by using different algorithms by changing the UIC threshold (window size).

The following known algorithms can be also used for this purpose.

(1) FIFO (first-in first-out
(2) FINUFO (first-in not used first-out)
(3) LRU (least recently used)

Two or three of the above algorithms can be used simultaneously.

Figure 5:
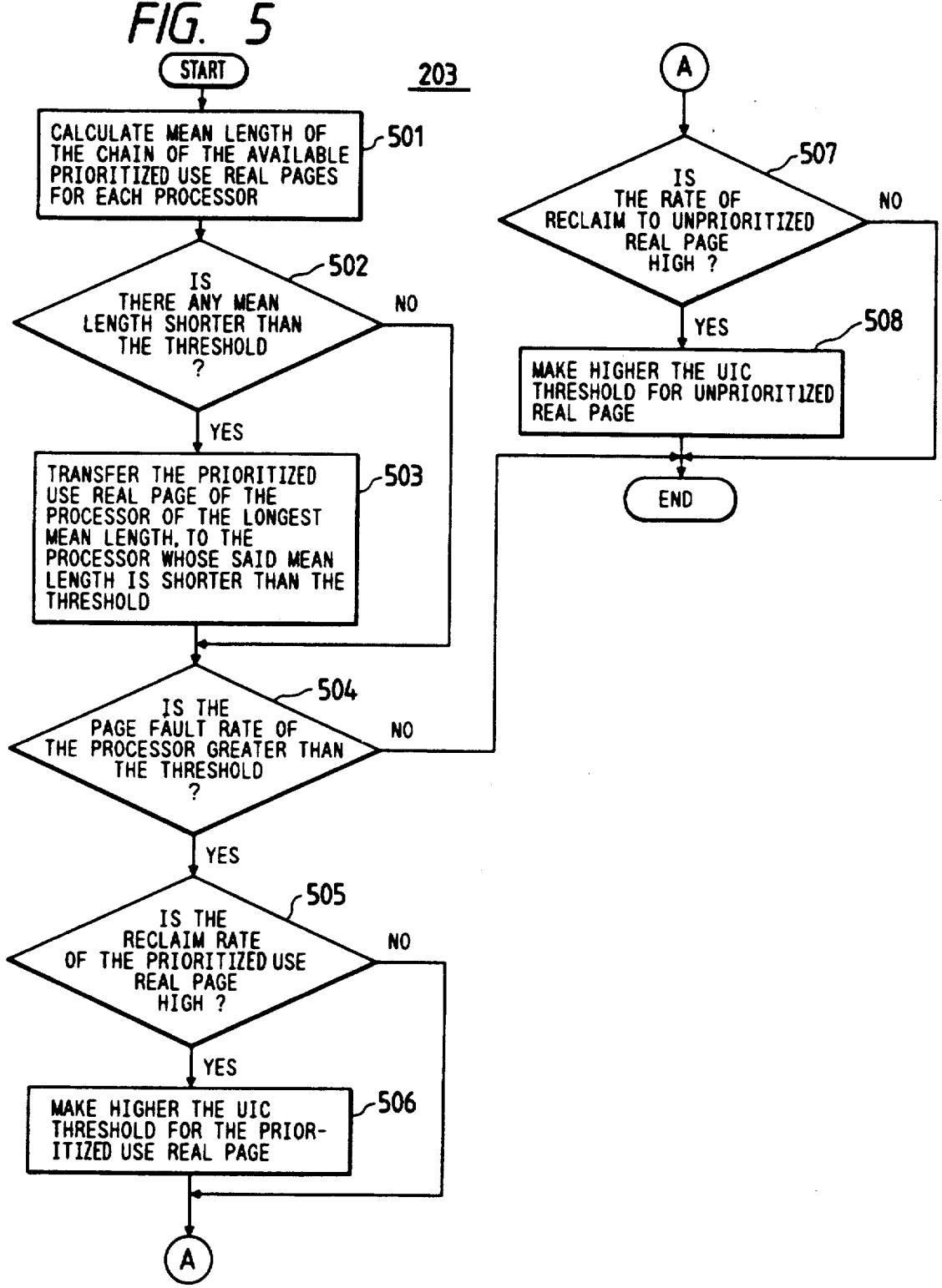
FIG. 5 is a flow chart for illustrating an embodiment of the memory management threshold control unit.

FIG. 5 is a flow chart for illustrating the memory management threshold control unit (Step 203). First, the ratio of the mean length of the available priority use real page chain for each processor to the count of allocation faults of the available priority use real pages of said processor is calculated (Step 501). When a processor has a short mean length of said real page chain and a high allocation fault rate of the available priority use real pages (Step 502), the use priority for the available priority use real pages of a processor having a long mean length of the available real page chain is passed to said processor (for example, some of the available real pages to be chained to the pointer 22C shown in FIG. 1 are transferred to the page group to be chained to the pointer 22A) (Step 503).

When a processor has a high page fault rate, the page steal UIC threshold is updated. When the reclaim rate of the priority use real pages is high (Step 505), the priority use real page UIC threshold is increased (Step 506). When the reclaim rate of general real pages is high (Step 507), the general page UIC threshold is increased (Step 508).

Figure 6:
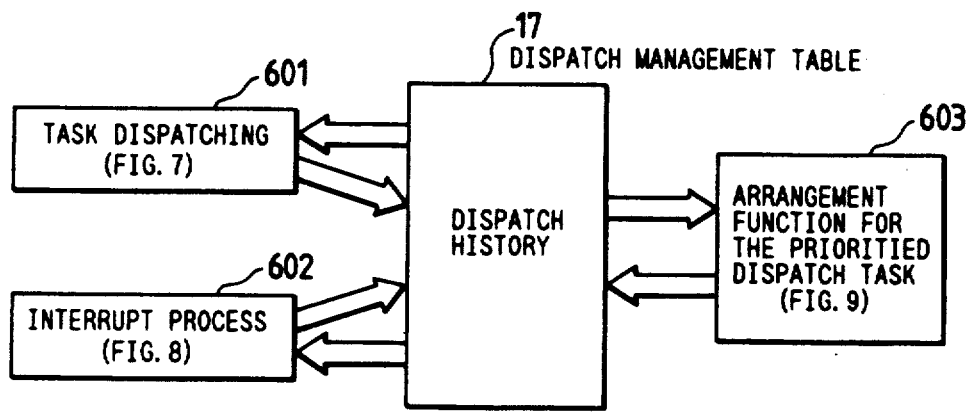
FIG. 6 illustrates the relation between the dispatching unit and the dispatch management table.

FIG. 6 illustrates the relation between the dispatching unit and the management table. (The relation between FIGS. 2 and 6 is such that after the task dispatching shown in FIG. 6 is performed, the real page allocation in FIG. 2 is performed. The operations in both drawings are performed alternately and repeatedly. The processing order of Steps 201 to 203 and 601 to 603 is not always fixed. The dispatch management unit in FIG. 6 comprises a task dispatching unit 601 and an interrupt processing unit 602. Both processing units execute the individual functions using the dispatch management table 17, and store the history in the dispatch management table 17 as a dispatch history. The priority dispatch task control unit 603 is periodically activated, and reconfigures the priority dispatch task of each processor according to the information stored in the dispatch management table 17.

Figure 7:
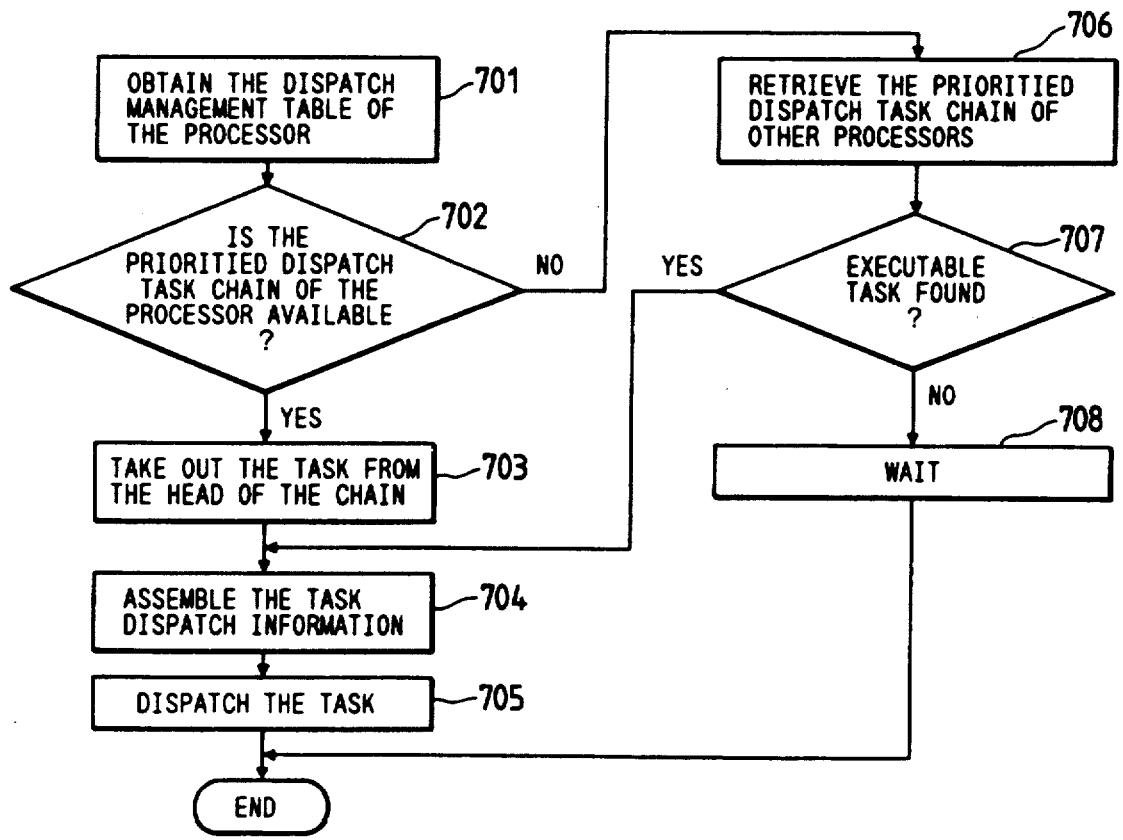
FIG. 7 is a flow chart, for illustrating an embodiment of the dispatching unit.

FIG. 7 is a flow chart for illustrating an embodiment of the dispatching unit 601. First, the dispatch management table 17 for the target processor is obtained (Step 701). Next, the priority dispatch task chains 21, 21', 21'', - - - for said processor are retrieved (Step 702). When the target chain is available, the task is fetched from the head of said chain (Step 703) and allocated to said processor (Step 705). When said chain is not available, the priority dispatch task chains of the other processors are retrieved (Step 706). When a ready task (executable task) is obtained by this retrieval (Step 707), said task is dispatched (Step 705). If no ready task is found when the priority dispatch task chains for all the processors of the multiprocessor are retrieved, said processors are put into the idle state (Step 708). When the dispatching is finished, the dispatch history is stored in the corresponding dispatch management table (Step 704).

Figure 8:
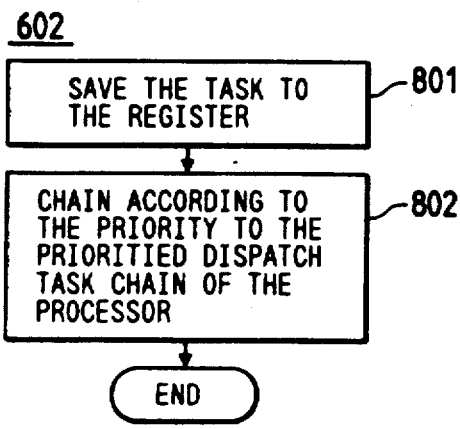
FIG. 8 is a flow chart for illustrating the interrupt processing unit.

FIG. 8 is a flow chart for illustrating the interruption unit 602. Said interruption unit is activated when a task is interrupted for some reason. First, to redispatch said task, the register is saved (Step 801). Said task is chained to the priority dispatch task chain of a processor which performs dispatching until that point of time according to the priority (Step 802). The number of real pages allocated to the task is measured for each of said groups, and for the next dispatch, said task is dispatched to the processor keeping the use priority for the group with a maximum number of real pages allocated to said task.

Figure 9:
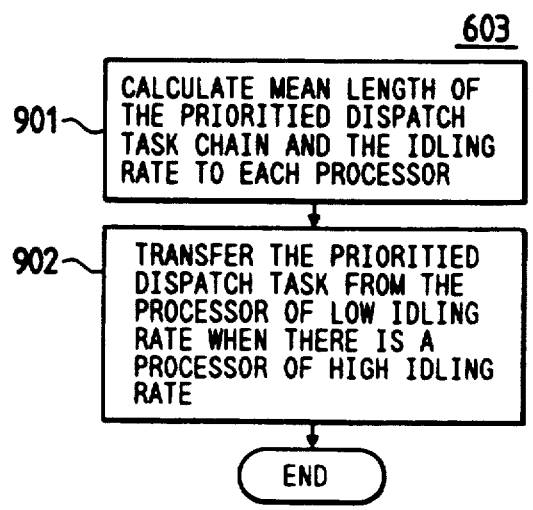
FIG. 9 is a flow chart for illustrating the priority dispatch task control. And, FIG. 10 is a schematic view of a changed embodiment of a system management table.

FIG. 9 is a flow chart for illustrating the priority dispatch task control unit 603. First, the mean length of the priority dispatch task chain and the idling rate of each processor are calculated (Step 901). When there is a processor of a high idling rate, the priority dispatch task is transferred from the processor of a low idling rate to said processor (Step 902).

In the use priority allocation processing, the use priority of the real pages of a real memory may be given to a processor of a maximum access speed to said real memory.

In the above page steal processing, the steal priority may be given to a group with a minimum number of pages allocated among the groups with real pages allocated to the tasks. The above embodiments of the present invention show a multiprocessor system comprising a plurality (4) of processors. The present invention is characterized in that the real pages of a real memory is divided into a plurality of groups which can be changed as follow.

Figure 10:
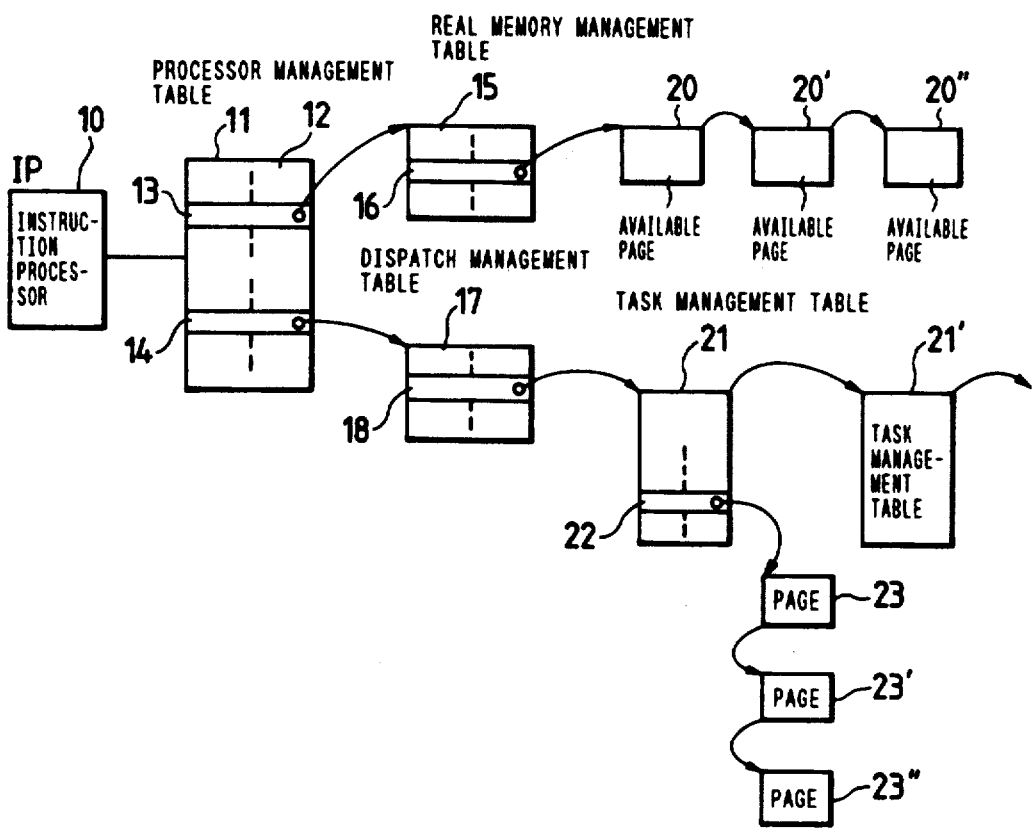

FIG. 10 is a schematic view of a changed embodiment. As compared with FIG. 1, the number of processors is reduced to 1 (Processor 1), and the number of functions for each processing such as the table is resultantly reduced to 1. For example, the blocks with numbers followed by alphabetic characters such as A, B, C, etc. shown in FIG. 1 are deleted except for the blocks with only numbers; that is, only the entry 12 of the processor management table 11, the management table 15, the dispatch management table 17, and the pointers 13 and 14 are used. It is an exception that a plurality of tasks are provided (the task management tables 21, 21', etc. are shown in FIG. 10). In the same way as with the processors in the embodiment of a multiprocessor system, the real pages divided into a plurality of groups can be allocated to said tasks for dispatching. A real memory region of a high access speed can be allocated to a task on a priority basis, and the handling of the real memory for a task which causes a mapping fault or the management of distribution of the available main memory region to the tasks can be executed in the same way as with the processors of the multiprocessor system.

As detailed above, the real memory management method of the present invention produces satisfactory results such that since the real pages of a real memory of a tightly coupled multiprocessor system are divided into a plurality of groups, a processor or task having the use priority that the real pages of a group can be used on priority basis is designated to said group, and when a real page allocation request occurs in a processor or task, the real pages belonging to a group for which said processor or task keeps the use priority can be allocated to said processor or task on a priority basis, when a task is dispatched, the main memory region for which said processor or task keeps the use priority is allocated to said task, and after said task loses control, the possibility of redispatching of said processor or task is increased, providing allocation of a main memory with few cache cancels and task dispatching.

What is claimed is:

1. In an information processing system for managing a virtual memory by using a multiprocessor system having a plurality of processors sharing a real memory, a real memory management method comprising the steps of:

assigning to a first processor a highest use priority, said highest use priority being given to any real page of said real memory to be used for said first processor;

allocating said real page of highest use priority to said first processor, when a real page allocation request occurs in a processor of said plurality of processors;

measuring a number of real pages allocated to a group of pages in a task for each of said processors; and dispatching to said first processor a maximum number of real pages allocated to said group of pages in said task on a highest use priority basis when said task is dispatched.

2. A real memory management method according to claim 1, wherein said first processor is a processor having a maximum access speed for accessing any real page to be used by said first processor.

3. A real memory management method according to claim 1, further comprising the steps of:

obtaining, when no available real pages are found for said first processor when a page fault occurs, at least one available real page from another processor having a maximum number of available real pages; and designating said other processor as said first processor.

4. A real memory management method according to claim 1, further comprising the steps of:

applying, in a process for stealing real pages allocated to a task, a different algorithm for each of said processors allocated to said task for page steal.

5. In an information processing system for managing a virtual memory by using a multiprocessor system having a plurality of processors sharing a real memory, a real memory management method comprising the steps of:

assigning to a first processor a highest use priority, said highest use priority being given to any real page of said real memory to be used for said first processor;

allocating said real page of highest use priority to said first processor, when a real page allocation request occurs in a processor of said plurality of processors;

measuring a number of real pages allocated to a task for each of said processors; and dispatching to said first processor a maximum number of real pages allocated to said task on a highest use priority basis when said task is dispatched.

6. In an information processing system for managing a virtual memory by using a multiprocessor system having a plurality of processors sharing a real memory, a real memory management method comprising the steps of:

assigning to a first processor a highest use priority, said highest use priority being given to any real page of said real memory to be used for said first processor; and allocating said real page of highest use priority to said first processor, when a real page allocation request occurs in a processor of said plurality of processors;

obtaining page fault occurrence information for each processor; and increasing the number of real pages to be processed by said first processor which is assigned as a processor of a highest mapping fault rate for a predetermined period.

7. In an information processing system for managing a virtual memory by using a multiprocessor system having a plurality of processors sharing a real memory, a real memory management method comprising the steps of:

assigning to a first processor a highest use priority, said highest use priority being given to any real page of said real memory to be used for said first processor;

allocating said real page of highest use priority to said first processor, when a real page allocation request occurs in a processor of said plurality of processors;

applying, in a process for stealing real pages allocated to a task, a different algorithm for each of said processors allocated to said task for page steal;

wherein a page steal priority is given to a processors with a minimum number of pages allocated to said task.

8. A real memory management method for use in an information processing system managing a virtual memory by using a processor and a real memory comprising the steps of:

dispatching a plurality of tasks in said virtual memory;

assigning to a first task a highest use priority, said highest use priority being given to any real page of said real memory to be used for said first task;

allocating said real page of highest use priority to said first task, when a real page allocation request occurs in a task of said plurality of tasks;

measuring a number of real pages allocated to each of said tasks; and dispatching to said first task a maximum number of real pages allocated to said task on a highest use priority basis when said task is dispatched.

9. In an information processing system managing a virtual memory by using a multiprocessor system having a plurality of processors sharing a real memory, a real memory management comprising:

means for assigning to a first processor a highest use priority, said highest use priority being given to any real page of said real memory to be used for said first processor;

means for allocating said real page of highest use priority to said first processor, when a real page allocation request occurs in a processor of said plurality of processors;

obtaining page fault occurrence information for each processor; and increasing the number of real pages to be processed by said first processor which is assigned as a processor of a highest mapping fault rate for a predetermined period.

10. A real memory management system according to claim 9; wherein said first processor is a processor having a maximum access speed of accessing any real page to be used by said first processor.

11. In an information processing system managing a virtual memory by using a multiprocessor system having a plurality of processors sharing a real memory, a real memory management system comprising:
- means for assigning to a first processor a highest use priority, said highest use priority being given to any real page of said real memory to be used for said first processor;
- means for allocating said real page of highest use priority to said first processor, when a real page allocation request occurs in a processor of said plurality of processors;
- means for measuring a number of real pages allocated to a task for each of said processors; and
- means for dispatching to said first processor a maximum number of real pages allocated to said task on a highest use priority basis when said task is dispatched.

12. In an information processing system managing a virtual memory by using a processor and a real memory, a real memory management system comprising:
- means for dispatching a plurality of tasks in said virtual memory;
- means for assigning to a first task a highest use priority, said highest use priority being given to any real page of said real memory to be used for said first task;
- means for allocating said real page of highest use priority to said first task, when a real page allocation request occurs in a task of said plurality of tasks;
- means for measuring a number of real pages allocated to each of said tasks; and
- means for dispatching to said first task a maximum number of real pages allocated to said task on a highest use priority basis when said task is dispatched.

* * * * *